Jan. 18, 1955 R. D. ZELANTE 2,699,719
AUTOMATIC SOFT AND HARD BOILED EGG COOKER
Filed Sept. 27, 1952 2 Sheets-Sheet 1
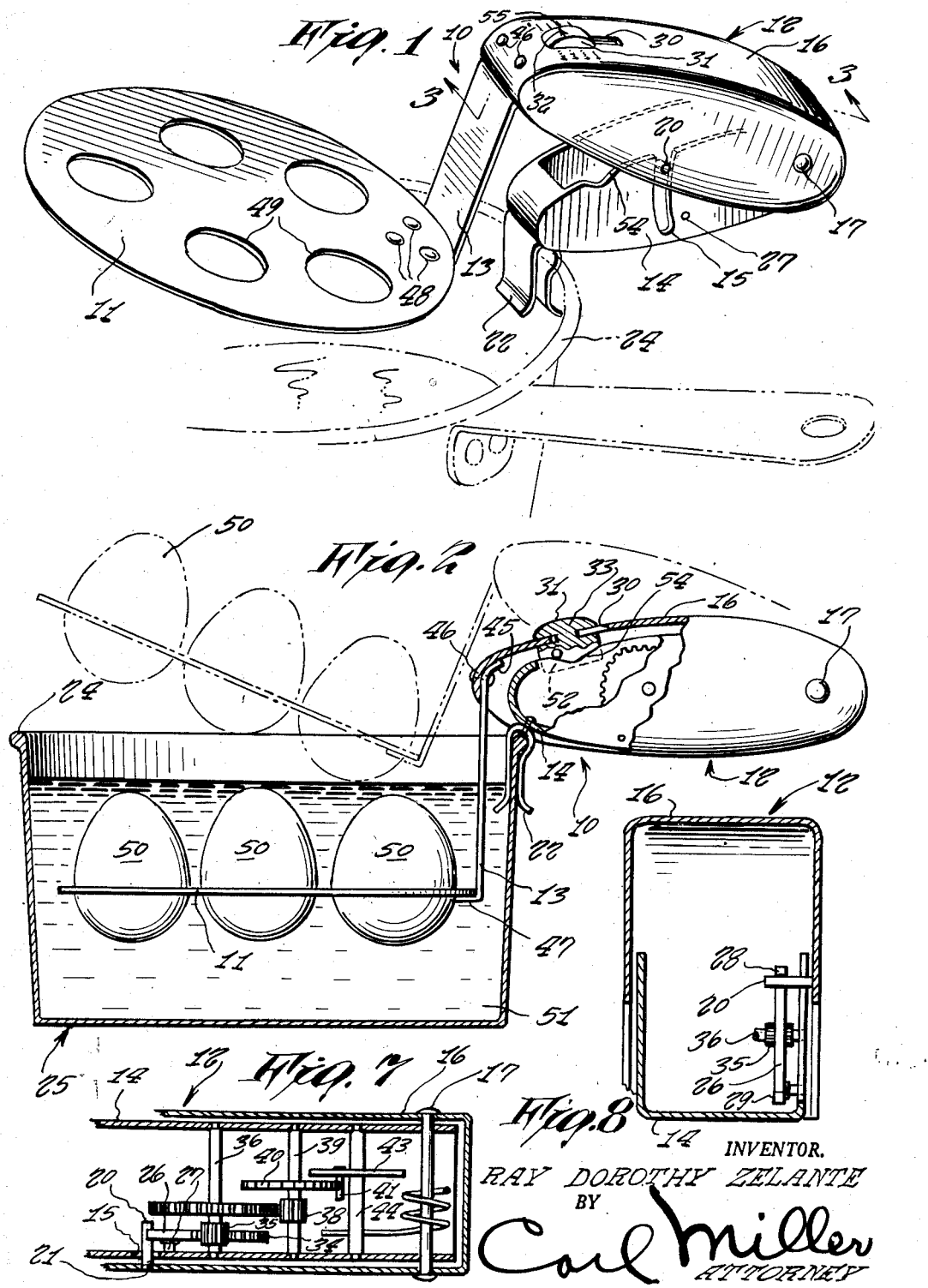
INVENTOR.
RAY DOROTHY ZELANTE
BY Carl Miller
ATTORNEY

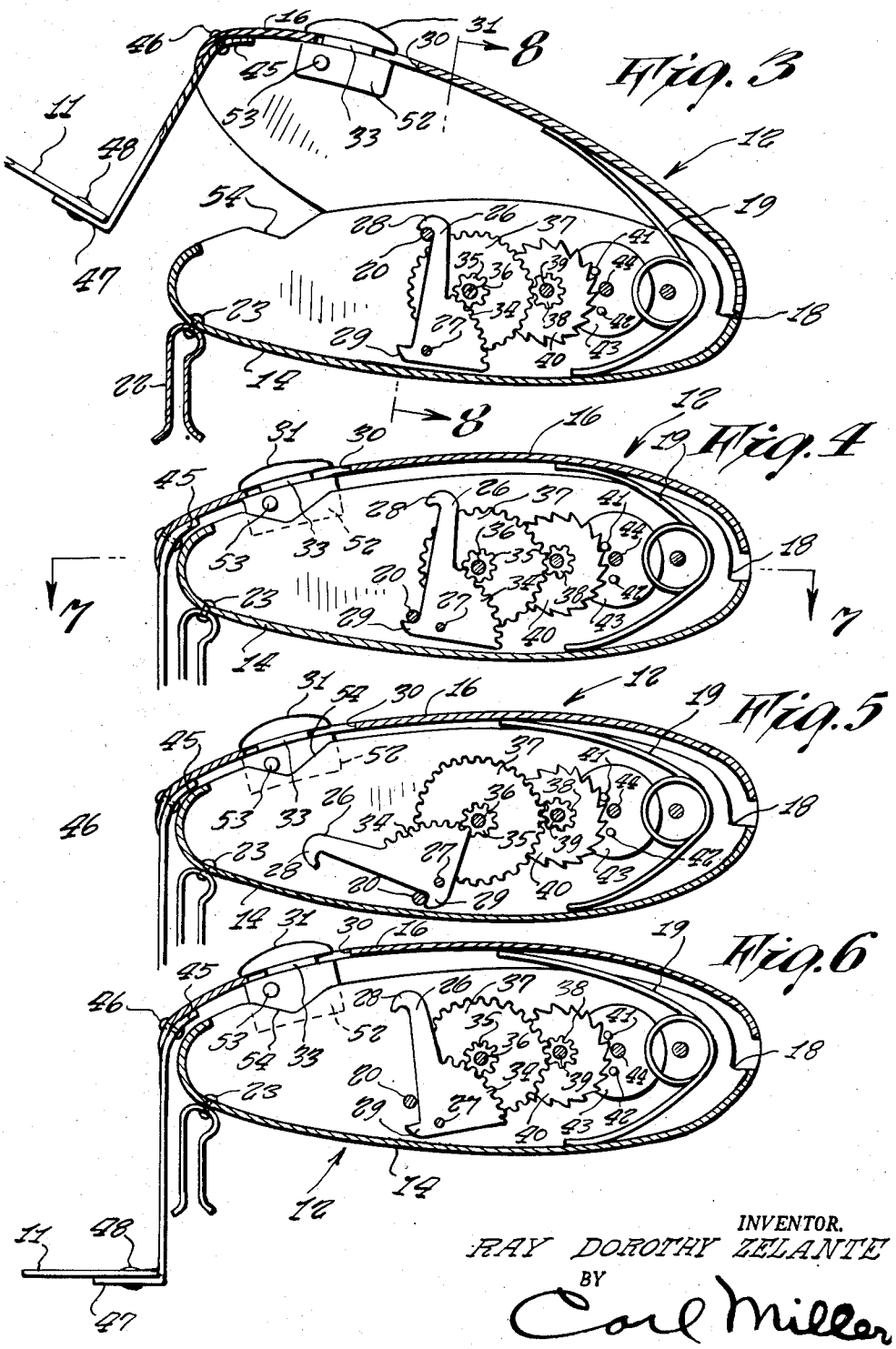

United States Patent Office 2,699,719
Patented Jan. 18, 1955

2,699,719

AUTOMATIC SOFT AND HARD BOILED EGG COOKER

Ray Dorothy Zelante, Brooklyn, N. Y.

Application September 27, 1952, Serial No. 311,819

7 Claims. (Cl. 99—336)

This invention relates to an automatic soft and hard boiled egg cooker.

It is an object of the present invention to provide an automatic soft and hard boiled egg cooker which can be readily and easily attached and detached from a conventional cooking pot or similar vessel and which contains a concealed clock mechanism which can be set for a cooking period of from zero to five minutes, the cooking period being set before or after the device is attached to the cooking pot or similar vessel.

It is another object of the present invention to provide an automatic soft and hard boiled egg cooker wherein the eggs being cooked are arranged in a horizontal plane with each egg in a vertical position thereby allowing the yoke of the egg to cook evenly and wherein the upward travel of the eggs after the timer mechanism has released the device is sufficiently retarded to eliminate jerkiness.

Other objects of the present invention are to provide an automatic soft and hard boiled egg cooker bearing the above objects in mind which is of simple construction, inexpensive to manufacture, has a minimum number of parts, is compact, pleasing in appearance, is durable, will have long life, is easy to use and is efficient in operation.

For other objects and for a better understanding of the invention, reference may be had to the following detailed description taken in connection with the accompanying drawing, in which:

Fig. 1 is a perspective view of an automatic soft and hard boiled egg cooker embodying the features of the present invention and showing the same in a raised position;

Fig. 2 is a side elevational view of the cooker attached to an ordinary pot showing the device in a lowered position and broken away to show the interior construction thereof;

Fig. 3 is a vertical sectional view taken along line 3—3 of Fig. 1 and showing the position of the timer mechanism parts before closing the casing and setting the timer mechanism;

Fig. 4 is a view similar to Fig. 3 but showing the casing closed before setting the timer mechanism;

Fig. 5 is a view similar to Fig. 3 but showing the casing closed and the timer mechanism set for cooking;

Fig. 6 is a view similar to Fig. 3 but showing the timer mechanism parts at the end of the cooking period and the beginning of the retarded rising of the egg-carrying plate;

Fig. 7 is a fragmentary transverse sectional view taken along line 7—7 of Fig. 4 and Fig. 8 is a vertical sectional view taken along line 8—8 of Fig. 3.

Referring now in detail to the figures, and in the practice of my invention, there is shown an automatic soft and hard boiled egg cooker, referred to collectively as 10, and consisting of an egg-carrying circular plate 11 joined to a combination handle and timer mechanism, referred to collectively as 12, by means of an arm 13.

The timer mechanism 12 includes a cigar-shaped container 14 open at the top and provided at the upper edge of one of its longitudinal side walls with a downwardly extending slot 15 for a purpose to be hereinafter referred to.

An inverted cigar-shaped cover 16 is pivotally secured to the rear end of the container 14 by means of a rivet 17 passing through aligned holes in the side walls of the cover and container. As shown in Figs. 3-6, the container 14 at the rear thereof is provided with a cut-out 18 adapted to receive the lower rear edge of the cover 16 when the latter is in a raised position.

An expansion spring 19 surrounds the rivet 17 and has its upper end abutting the inner surface of the cover 16 and its lower end abutting the inner surface of the container 14, as shown in Figs. 3-6, whereby to normally spring urge the pivoted cover 16 to a raised position. An inwardly extending pin 20 is carried by the cover 16 and rides in the slot 15, the outer end of the pin being threaded externally to engage an internally threaded opening 21 near the lower edge of the cover and aligned with the slot 15.

A clamp 22 is secured to the bottom of the container 14 near the front thereof by means of rivets 23 and resiliently engages the rim 24 of a cooking pot 25, as shown in Fig. 2, whereby to secure the timer mechanism 12 thereto in a horizontal position.

A trigger gear 26 is rigidly secured to a shaft 27 and is adapted to engage the pin 20 between its hooks 28 and 29, the shaft 27 being journaled in the container 14 rearwardly adjacent the slot 15. The top of the cover 16 is provided with a longitudinal rectangular slot 30 slidably receiving a knob 31 marked on its upper surface with an arrow 32 extending transversely thereof and for a purpose to be hereinafter described.

The knob 31 has an integrally formed intermediate portion 33 adapted to slide longitudinally within the slot 30 and an enlarged lower portion 52 having fixedly secured thereto at one side a pin 53. The pin 53 extends horizontally from one side of the enlarged portion 52. It should be apparent that this pin 53 will contact the upper edge of the side wall of the container 14 when the cover is manually closed upon the container against the action of the spring 19. The upper edge of the container 14 below the pin 53 is accordingly provided with a V-shaped cut-out 54 extending substantially the length of the enlarged lower portion 52 of the knob 31 and adapted to engage the pin 53 therealong in various longitudinal positions of the latter. As will be apparent from the figures, the pin 53 is limited to movement along the forward part of the cut-out 54 by the spacing of the slot 30, the intermediate portion 33 abutting the rear end of the slot when the pin is at the bottom of the forward part of the cut-out. It will also be apparent that this position of the pin permits the lowering of the cover 16 to a greater extent than when the pin is positioned above the top of the forward part of the cut-out 54. The spacing of the pin 20 and the cut-out 54 is such that the pin 20 contacts the hooked end 29 with the pin 53 slightly spaced from the cut-out 54. Further downward movement of the cover 16 and the pin 20 depends on the position of the pin 53 longitudinally of the cut-out 54, this downward movement of the pin forcing the trigger-gear 26 to rotate in a counter-clockwise direction. This rotation is greatest when the pin 53 engages the lower portion of the cut-out 54 and least when it engages the front portion of the cut-out 54. A calibrated scale 55 is provided on the upper surface of the cover 16 adjacent the slot 30 and knob 31 and is read in connection with the arrow 32 in a manner to be hereinafter described.

When the cover is manually closed to the position shown in Fig. 4 with the pin 20 just engaging the hooked end 29 of the trigger gear 26 and the pin 53 spaced slightly from the cut-out 54, the power of the spring 19 is transmitted to the pin 20 through the cover 16. In this position, it can be seen from Fig. 4 that the pin 20 is free to ride upwardly and that the cover 16 will rise to the raised position shown in Fig. 3 if manually released. In this position of the trigger gear 26, the timer mechanism is set and the cover prevented from rising by further pressing the cover 16 downwardly with the pin 53 finally abutting the cut-out 54. This downward movement of the cover forces the pin 20 against the hooked end 29 and rotates the trigger gear 26 to the position shown in Fig. 5. It will be seen that the pin 53 engages the intermediate portion of the cut-out 54 whereby to prevent further downward movement of the cover 16, the pin 20 and to prevent further rotation of the trigger-gear 26. In this position of the pin 53, the trigger-gear 26 and the knob 31, the arrow 32 points to 2½ minutes on the scale 55, and the pin 20 is maintained against upward displacement by the lower edge of the trigger-gear 26, it being obvious that the upward movement of the pin 20 must follow a substantially vertical arc which intersects the edge of the gear 26 intermediate the hooked ends 28 and 29.

The trigger-gear 26 is slowly returned to its original position under the action of the pin 20 and the spring 19 by means of an escapement to be hereinafter described, it being obvious that the period of return is proportional to the displacement of the trigger-gear 26 from its original vertical position which movement is in turn proportional to the longitudinal position of the knob 31 and the pin 53 within the slot 30 and the cut-out 54 respectively. It should also be obvious that the period of return can be preset by movement of the knob 31 and arrow 32 along the scale 55, with the scale reading upwardly in minutes in a rearward direction along the slot 30, the scale in this case starting at zero and terminating at five, the units being minutes.

The gear 26 is provided on the side remote from the hooked ends 28 and 29 with an arcuate gear portion 34 disposed in circular relation to the shaft 27, the teeth of the arcuate gear portion 34 meshing with a pinion gear 35 rigidly secured to a shaft 36 journaled in the sides of the container 14. The shaft 36 is free to rotate and fixedly carries a large gear 37 which meshes with a pinion gear 38 rigidly secured to a shaft 39 similarly journaled in the sides of the container 14. The shaft 39 is free to rotate and carries fixedly an escapement wheel 40 provided with ratchet teeth which engage pins 41 and 42 rigidly secured to a balance wheel 43 fixedly carried by an oscillating shaft 44 journaled in the sides of the container 14.

As the trigger gear 26 rotates in a clockwise direction under the action of the pin 20 and the spring 19 from its position shown in Fig. 5, it turns the pinion gear in a counterclockwise direction, which motion also turns the large gear 37 in a counter-clockwise direction. This in turn imparts clockwise motion to the pinion gear 38 and the escapement wheel 40 causing the balance wheel 43 to oscillate.

When the trigger gear 26 reaches the position shown in Fig. 6, the pin 20 slowly starts to rise, carrying with it the cover 16. It should be obvious that the pin 20 will travel in a retarded manner from the hooked portion 29 to the hooked portion 28 under the action of the escapement device previously described, thus slowly raising the cover 16 to its raised position shown in Fig. 3.

The upper end of the arm 13 is curved inwardly as at 45 to coincide with the undersurface of the cover 16 at the front thereof and is rigidly secured thereto by means of rivets 46. The lower end of the arm 13 is bent inwardly at right angles thereto, as at 47, and is rigidly secured to the undersurface of the circular plate 11 by means of rivets 48.

The plate 11 is provided with a plurality of spaced circular openings 49 adapted to support the eggs 50 in a vertical position, as shown in Fig. 2, in boiling water 51. This verticality permits the yoke of the egg to cook evenly.

In operation, the handle 12 is secured to the rim 24 of the cooking pot 25 by means of the clamp 22, with the eggs 50 in position on the plate 11 in the holes 49. The knob 31 is then set in the appropriate longitudinal position within the slot 30, reference being had to the scale 55 and the arrow 32 to select the desired cooking period from one to five minutes. The cover is then lowered manually against the action of the spring 19 to the position shown in Fig. 5, with the trigger-arm 26 in operative engagement with the pin 20. During this operation, the downward pressure on the pin 20 rotates the trigger-arm 26 to the appropriate angular position, depending on the position of the knob 31 and arrow 32. The eggs are now in the boiling water and will remain submerged until the end of the cooking period, at which time the cover slowly rises in the manner previously described, raising the eggs slowly from the water. The clamp 22 may then be detached from the rim 24 of the cooking pot 25 and the eggs and device removed from the pot to cool the eggs under cold running water while still on the plate. The plate 11 containing the cooled eggs may then be used as a convenient server.

While various changes may be made in the detailed construction, it shall be understood that such changes shall be within the spirit and scope of the present invention as defined by the appended claims.

Having thus set forth and disclosed the nature of my invention, what is claimed is:

1. An egg cooker comprising an egg-carrying plate, a vertically extending arm secured to said plate, and a combination handle and timing mechanism secured to said arm including a clamp adapted to resiliently engage the rim of a cooking pot, said combination handle and timing mechanism comprising a hollow container open at the top, an inverted hollow cover adapted to slide onto said container and pivotally secured thereto at its rear portion, said arm being secured at its upper end to said cover at the front portion thereof, said clamp being secured to said container at the front bottom portion thereof, spring means for normally maintaining said cover in a raised position with said arm and egg-carrying plate in a raised position above a cooking pot, a timing mechanism located within said container including means for maintaining said cover in a closed position against the action of said spring means for a predetermined length of time, and means accessible from the outside of said container and cover for adjusting the setting of said timing mechanism.

2. An egg cooker according to claim 1, said egg-carrying plate consisting of a substantially circular plate provided with a plurality of spaced openings adapted to receive a plurality of eggs in vertically spaced positions, said plate being secured to said vertically extending arm at substantially right angles thereto whereby to maintain the eggs within a cooking pot in a horizontal position when said arm is in a lowered position.

3. An egg cooker according to claim 1, said vertically extending arm having its lower end inwardly bent at substantially right angles thereto, said inwardly bent portion being rigidly secured to the undersurface of said plate, said vertically extending arm having its upper end outwardly bent so as to coincide with the front undersurface of said cover, said outwardly bent portion being rigidly secured to the undersurface of said cover.

4. An egg cooker according to claim 1, said hollow container being substantially cigar-shaped, said hollow cover being substantially cigar-shaped and adapted to surround said container at the sides and top thereof, the rear portion of said cover being pivotally secured to said container at the rear thereof, said container at the rear upper edge thereof having a cut-out portion adapted to receive the rear lower edge of said cover when the latter is in a raised position.

5. An egg cooker according to claim 1, said spring means for normally maintaining said cover in a raised position comprising a helical expansion spring having expanding extended ends, one of said ends abutting the bottom interior of said container, the other of said ends abutting the top interior of said cover, the body of said spring being located in the rear of said container.

6. An egg cooker according to claim 1, said means for maintaining said cover in a closed position against the action of said spring means comprising an inwardly extending pin rigidly secured to said cover adjacent its lower edge at one side thereof, said container at its upper edge at one side thereof having a downwardly extending slot adapted to receive said pin, said slot terminating near the bottom of said container, and a pivotally mounted trigger gear within said container adapted to engage said pin and to maintain said pin at the base of said slot, said trigger gear being in operative engagement with said timing mechanism.

7. An egg cooker according to claim 1, said timing mechanism comprising a rotatably mounted pinion gear adapted to mesh with said means for maintaining said cover in a closed position, a rotatable shaft fixedly secured to said pinion gear, a large gear fixedly secured to said shaft, a second pinion gear rotatably mounted on a second shaft and adapted to mesh with said large gear, said second shaft being fixedly secured to said second pinion and rotatably mounted within said container, an escapement wheel rigidly secured to said second shaft, said escapement wheel having ratchet teeth, a third shaft rotatably mounted within said container, a balance wheel rigidly secured to said third shaft, and a pair of pins rigidly secured to said balance wheel and adapted to operatively engage said ratchet teeth of said escapement wheel whereby to retard the return motion of said means for maintaining said cover in a closed position against the action of said spring.

References Cited in the file of this patent

UNITED STATES PATENTS

| Number | Name | Date |
|---|---|---|
| 422,563 | Barrett | Mar. 4, 1890 |
| 816,072 | Chesbrough | Mar. 27, 1906 |
| 1,096,250 | Lamb | May 12, 1914 |
| 2,503,960 | McCullough | Apr. 11, 1950 |